United States Patent
Prewitt, Jr. et al.

(10) Patent No.: US 10,437,651 B2
(45) Date of Patent: Oct. 8, 2019

(54) INTELLIGENT MAPPING OF EMPIRICAL DATA

(71) Applicant: International Business Machines Corporation, Armonk, NY (US)

(72) Inventors: Richard D. Prewitt, Jr., Centre Hall, PA (US); Marna L. Walle, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 14/860,967

(22) Filed: Sep. 22, 2015

(65) Prior Publication Data

US 2017/0083631 A1    Mar. 23, 2017

(51) Int. Cl.
| | |
|---|---|
| *G06F 17/30* | (2006.01) |
| *G06F 9/54* | (2006.01) |
| *G06F 11/30* | (2006.01) |
| *G06F 11/34* | (2006.01) |

(52) U.S. Cl.
CPC .......... *G06F 9/542* (2013.01); *G06F 11/3024* (2013.01); *G06F 11/3409* (2013.01)

(58) Field of Classification Search
CPC ... G06F 11/3409; G06F 11/3024; G06F 9/542
USPC .................. 717/131, 132, 133, 143; 707/736
See application file for complete search history.

(56) References Cited

U.S. PATENT DOCUMENTS

| | | | | |
|---|---|---|---|---|
| 5,682,328 A | * | 10/1997 | Roeber | G06F 11/3476 702/187 |
| 7,559,065 B1 | * | 7/2009 | Sosnovsky | G06F 9/542 719/318 |
| 8,584,099 B1 | | 11/2013 | Abi-Antoun et al. | |
| 2001/0044827 A1 | * | 11/2001 | Zhuk | G06N 5/043 709/205 |
| 2003/0084018 A1 | * | 5/2003 | Chintalapati | G06F 11/3409 |
| 2004/0216134 A1 | * | 10/2004 | Hammerich | G06F 9/542 719/318 |
| 2007/0094060 A1 | * | 4/2007 | Apps | G06F 17/30398 705/7.36 |
| 2007/0226233 A1 | * | 9/2007 | Walter | G06F 17/3056 |
| 2007/0271573 A1 | * | 11/2007 | Chandrasekaran | G06F 9/542 719/318 |
| 2008/0127120 A1 | * | 5/2008 | Kosche | G06F 11/3447 717/131 |
| 2010/0070981 A1 | * | 3/2010 | Hadar | G06F 9/542 719/318 |

(Continued)

OTHER PUBLICATIONS

Bowman et al., "Connecting Architecture Reconstruction Frameworks", Information and Software Technology 42, No. 2, 2000, pp. 91-102.

Callo Arias et al., "Defining and Documenting Execution Viewpoints for a Large and Complex Software-Intensive System", Journal of Systems and Software 84, No. 9, Sep. 2011, pp. 1447-1461.

(Continued)

*Primary Examiner* — Shiow-Jy Fan
(74) *Attorney, Agent, or Firm* — David B. Woycechowsky

(57) ABSTRACT

Embodiments of the present invention provide systems and methods for performing data analysis. Mapping analytics are applied on data which contains extensive information. Mapped building blocks are found by applying mapping analytics. These mapped building blocks help determine which functions are in use within a system. By determining which functions are in use within a system, a higher-level of functionality in use can also be determined.

8 Claims, 3 Drawing Sheets

(56) References Cited

U.S. PATENT DOCUMENTS

| | | | |
|---|---|---|---|
| 2012/0124584 A1* | 5/2012 | Addala | G06F 9/542 |
| | | | 718/102 |
| 2012/0239703 A1* | 9/2012 | Blight | G06F 17/30566 |
| | | | 707/802 |
| 2014/0074966 A1* | 3/2014 | Amrhein | H04L 67/1021 |
| | | | 709/217 |
| 2014/0156786 A1* | 6/2014 | Boskovic | G06F 9/541 |
| | | | 709/217 |
| 2014/0279808 A1 | 9/2014 | Strassner | |
| 2014/0282456 A1* | 9/2014 | Drost | G06F 8/76 |
| | | | 717/158 |
| 2014/0310235 A1* | 10/2014 | Chan | G06F 17/30598 |
| | | | 707/603 |
| 2014/0359588 A1 | 12/2014 | O'Boyle et al. | |

OTHER PUBLICATIONS

Callo Arias et al., "A top-down strategy to reverse architecting execution views for a large and complex software-intensive system: An experience report", Science of Computer Programming 76, No. 12, 2011, pp. 1098-1112.

Deursen et al., "Symphony: View-Driven Software Architecture Reconstruction", Proceedings of the Fourth Working IEEE/IFIP Conference on Software Architecture (WICSA'04), Jun. 12-15, 2004, pp. 122-132.

U.S. Appl. No. 14/932,473, filed Nov. 4, 2015, Entitled "Intelligent Mapping of Empirical Data".

Appendix P: List of IBM Patents or Patent Applications Treated as Related, dated Nov. 4, 2015, 2 pages.

* cited by examiner

INTELLIGENT MAPPING OF EMPIRICAL DATA

BACKGROUND OF THE INVENTION

The present invention relates generally to the field of data profiling and more specifically to the mapping of empirical data.

Software systems often gather management, measurement, and monitoring records. This gives a user information about the events occurring during software execution. No two systems operate in exactly the same manner causing every system to have differing records. The information about these events occurring during software execution results in very detailed and abundant data.

SUMMARY

According to one embodiment of the present invention, a method for performing data analysis, the method comprising the steps of: collecting, by one or more processors, during software execution, data pertaining to system events; causing, by one or more processors, during the software execution, a data consumption program to retrieve the collected data pertaining to the system events; mapping, by one or more processors, one or more building blocks; and determining, by one or more processors, a higher-level of functionality from the mapped one or more building blocks.

Another embodiment of the present invention provides a computer program product for performing data analysis, based on the method described above.

Another embodiment of the present invention provides a computer system for performing data analysis, based on the method described above.

DETAILED DESCRIPTION

Information pertaining to software executions are detailed and abundant in nature. Embodiments of the present invention describes systems and methods to refine the detailed and abundant data. By applying intelligent mapping as disclosed by the present invention, it is possible to know exactly which functions are in use on any system and identify data consumption challenges while maintaining the confidentiality of sensitive data. The high-level functional information which has been extracted will be used in further processing. Additionally, this solution can be iteratively applied such that previous high-level information can be used in higher-level information gathering.

Figure 1:
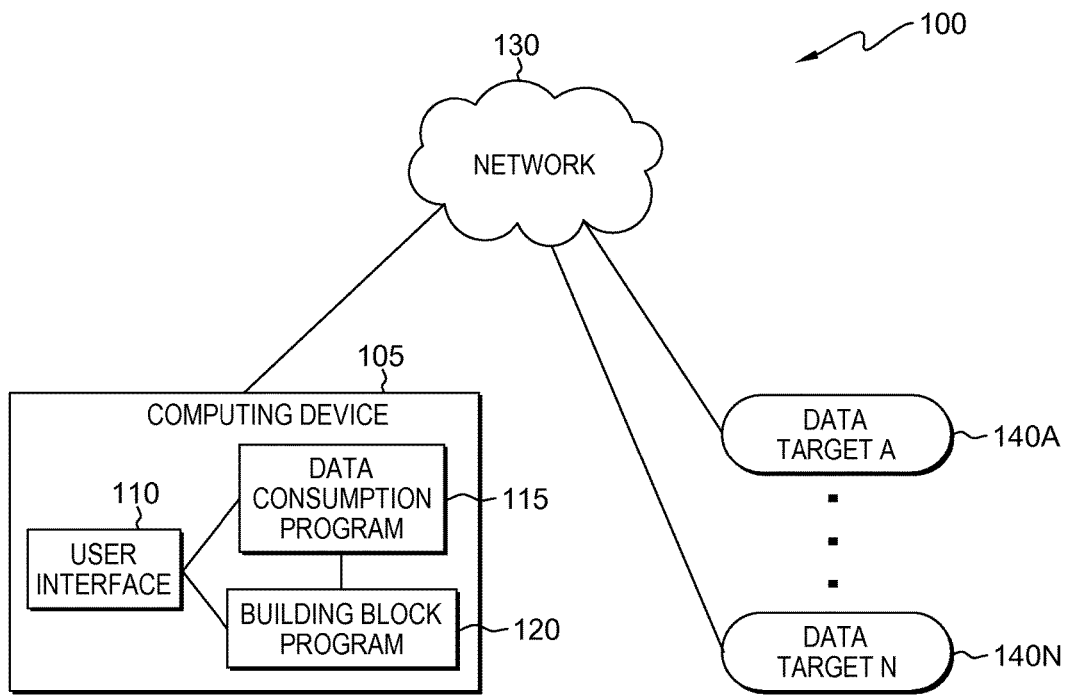
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes data targets 140A-N, network 130, and computing device 105.

Network 130 can be, for example, a local area network (LAN), a wide area network (WAN) such as the Internet, or a combination of the two, and can include wired, wireless, or fiber optic connections. In general, network 130 can be any combination of connections and protocols that will support communication between computing device 105 and data targets 140A-N.

Data targets 140A-N refer to an "end-point" which receives data from data consumption program 115. Data can also be sent to the data consumption program. Such computing systems may include a server, a desktop or laptop PC, a PDA or a Smart phone. Conventionally, one endpoint has only one host. In such instances, a host is an end-point, such as a conventional desktop PC, typically having a main processor, possibly one or more coprocessors, and typically running an operating system. Additional subsystems such as various peripherals, network interface devices, modems, etc. are sometimes connected to data targets 140A-N for a variety of purposes.

Computing device 105 consists of user interface 110, data consumption program 115, and building block program 120. Computing device 105 may be a laptop computer, a tablet computer, a netbook computer, a personal computer (PC), a desktop computer, a personal digital assistant (PDA), a smart phone, a thin client, or any programmable electronic device capable of communicating with data targets 140A-N via network 130. Computing device 105 may include internal and external hardware components, as depicted and described in further detail with respect to FIG. 5.

User interface 110 may be a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. User interface 110 is capable of receiving data, user commands, and data input modifications from a user. User interface 110 is also capable of communicating with data consumption program 115 and building block program 120.

In this exemplary embodiment, data consumption program 115 is an application capable of reading, consuming, and manipulating data from building block program 120. In a preferred exemplary embodiment, data consumption program 115 is a migration profiler program. Migration profiler programs can be derived from a system which has the value of reducing data migration failures by: allowing systems administrators to know which functions of products are installed in a system; consolidating which functions are in use on a particular system and across systems; making migration patterns more easily recognizable; determining which migrations are necessary; and allowing software vendors to analyze usage trends and profiles from information gathered from a migration profiler. In other exemplary embodiments, data consumption program 115 can be an exploitation profiler program or a security profiler program.

In this exemplary embodiment, building block program 120 works in conjunction with data consumption program 115. Building block program 120 gathers detailed data pertaining to software executions. Building block program 120 keeps sensitive system data on a system where it was generated (i.e., not compromising confidential data); obtains higher-level function information on the gathered detailed data pertaining to software executions; and applies an iterative approach in order to use higher-level function information for further higher-level information gathering (i.e., applying the obtained higher-level function information to gain further and more detailed understanding of functionality). Building block program 120 provides intelligent mapping of the detailed records collected (from management, measurement, and monitoring records) as a reflection of a higher-level function in use. For example, the intelligent mapping can be utilized on SMF records in z/OS. Without the intelligent mapping, determination of the higher-level function in use from the detailed data collected is not as feasible.

Figure 2:
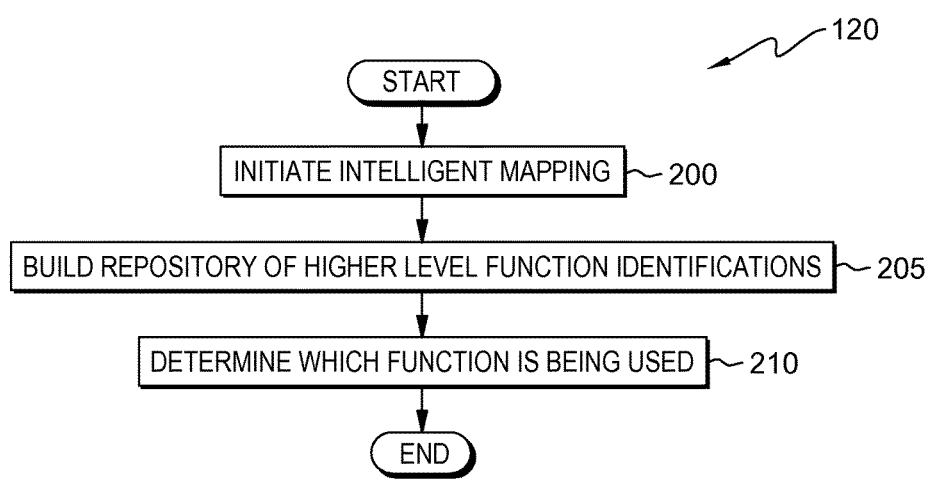
FIG. 2 is a flowchart depicting the operational steps of building block program 120 for determining which function is being used, in accordance with an embodiment of the present invention.

FIG. 2 is a flowchart depicting the operational steps of building block program 120 for determining which function is being used, in accordance with an embodiment of the present invention.

In step 200, building block program 120 initiates intelligent mapping. Intelligent mapping is carried out on the detailed and abundant data pertaining to software executions. Intelligent mapping functions by examining the detailed data in order to find building blocks. The building blocks from intelligent mapping contain the data type and fields to be further analyzed in step 210 in order to determine which functions are in use within a system.

In step 205, building block program 120 builds a repository of higher-level function identifications. Mapping building blocks are collected by building block program 120. Mapping building blocks can depend on other mapping building blocks. Thus, a higher understanding of larger functions which are in use within a system is obtained. For example, the information from the collected detailed data on a system and the mapping of the data to higher level functionality can be inputted into a data consumption program. In one exemplary embodiment, data consumption program 115 (e.g., a migration profiler program) uses the collected detailed data on a system and the mapping of the data to a higher functionality as an input and produces a resultant block of data which includes critical information pertaining to migration capabilities.

In step 210, building block program 120 determines which function is being used. From the resultant block of data, determinations can be made of which functions are and are not in use. For example, from mapping building block A, it can be stated that function X is being used. From another mapping building block B, it can be stated that function Y is being used. Mapping building block B indicates that function X has to be in use for function Y to be in use. Thus logically speaking, if function X is not in use, then function Y cannot be in use. Rather than repeating all the mapping in building block A for function X, building block B can indicate that function Y relies on function X being in use. Thus, if mapping for function X changes, the mapping only has to change in one place. This resultant block of data contains only the higher-level function used and not the sensitive detailed management and measurement records. As the resultant data does not contain any sensitive data, the resultant data can be shared with software vendors or other interested parties in order to see which functions are actively in use in the marketplace. In other embodiments, mapping building blocks can depend on other mapping building blocks to form a more detailed understanding of which larger functions are in use on a system.

Figure 3:
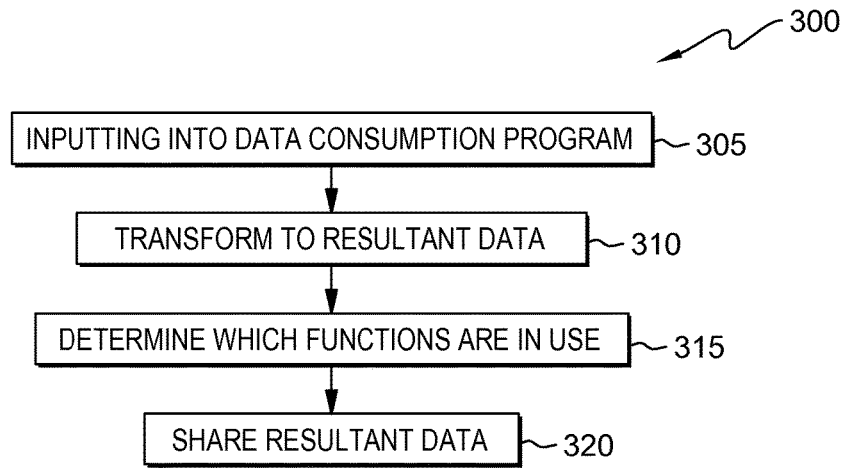
FIG. 3 is a flowchart depicting the flow of data from a data consumption program and a data target, in accordance with an embodiment of the present invention.

FIG. 3 is a functional block diagram 300 depicting the flow of data from a data consumption program and a data target, in accordance with an embodiment of the present invention.

In this exemplary embodiment, data is collected on a system of interest. The data is then mapped and correlated with a higher level of functionality. In step 305, the data which is either collected, mapped, and/or correlated with a higher level of functionality is inputted into a data consumption program. In a preferred exemplary embodiment, the data consumption program can be a migration profiler program. In step 310, the inputs into a data consumption program are transformed into resultant data. The resultant data contains only higher level functionality that is being used and not any sensitive (i.e., confidential) and measurement records.

In this exemplary embodiment, a user can analyze the contents of the resultant data. In step 315, a user determines which functions are in use and which functions are not in use. In step 320, the user shares with software vendors or other interested parties in order to see what functions are actively in use in the marketplace without sharing sensitive records. The sharing of resultant data is based on the user determination in step 315.

Figure 4:
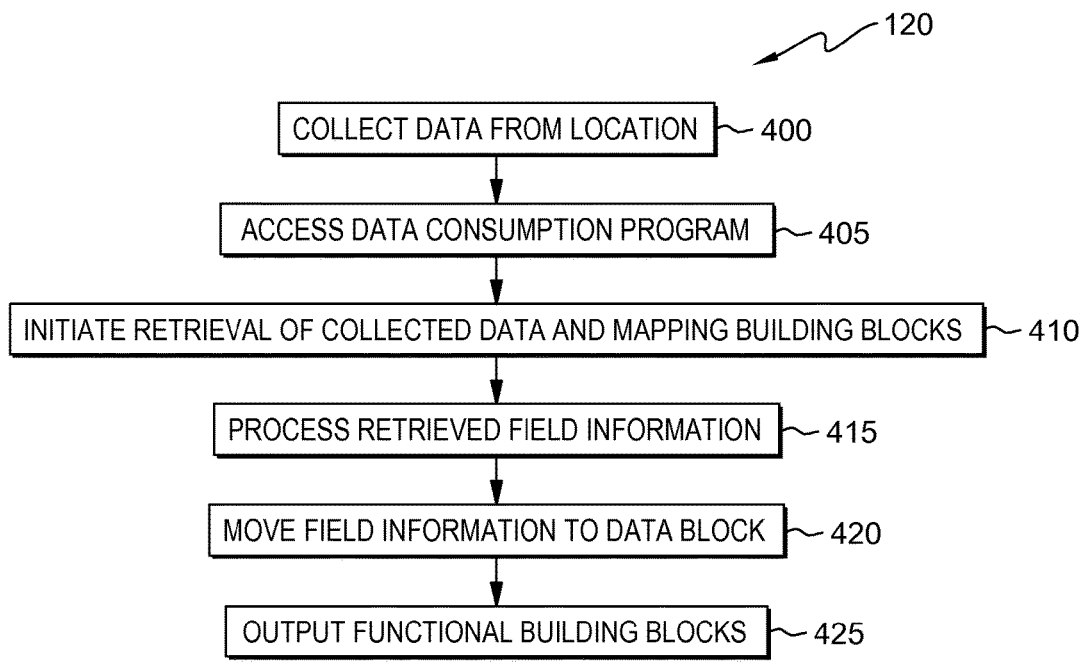
FIG. 4 is a flowchart depicting the operational steps of building block program 120 for outputting functional building blocks, in accordance with an embodiment of the present invention.

FIG. 4 is a flowchart depicting the operational steps of building block program 120 for outputting functional building blocks, in accordance with an embodiment of the present invention.

In step 400, building block program 120 collects data from a location. The data collected is very detailed and abundant as it pertains to existing management, measurement, and monitoring data. Without intelligent mapping of building blocks, the data collected will remain in its very detailed and abundant form. Thus, there is no understanding of the higher-level functionality of the data collected. The location can be referenced to later for further data analytics or other operations.

In step 405, building block program 120 accesses a data consumption program. In this exemplary embodiment, the data consumption program is a migration profiler program which works in conjunction with building block program 120. A migration profiler program allows information to be derived from a system which has the purpose of reducing migration failures to data targets. The migration profiler program may be located on a system. The data collected from step 400 may need to be moved to another system different from the system which houses the migration profiler program. In other embodiments, the data consumption program can have other functions.

In step 410, building block program 120 initiates retrieval of collected data and mapping building blocks. The intelligent mapping building blocks can also be referred to as smart function blocks. Building block program 120 works in conjunction with data consumption program 115 in order to retrieve an input for data consumption program 115. The input is the collected data from step 400. As further input to the data consumption program, the user indicates the location of the collected detailed data for further processing. The mapped building blocks look at evidence-based data from the system externally without prior knowledge of the inner flow, structure, or workings of the system. Building blocks do not dynamically change and only change upon evidence-based data on which the building blocks rely on. As long as the evidence-based data is in use, the building blocks remain valid. The building blocks can be iteratively applied on different systems.

In step 415, building block program 120 processes retrieved field information. The field information includes collected data and mapped building blocks. The field information is processed by extracting the field information and determining if the field information contains a function in use. Values in the field information are indicative of a function in use as depicted in step 210 in FIG. 2. The processing of the mapped building blocks provide a reflection of and insights into a higher-level functionality in use.

In step 420, building block program 120 moves the field information to a data block. As a result, a repository of the determinations of the higher-functionality in use is constructed. The repository is constructed by extracting information designated by the mapped building blocks. The data block is serving as a functional map.

In step 425, building block program 120 outputs the functional building blocks. The output reports which functions are on the system. The functional maps are also reported to a user. For example, the intelligent mapping building block for determining usage of the IBM™ HTTP Server may be: SMF record 103, offset decimal 24, for a length of 8 bytes, and a non-zero value. In the exemplary embodiment where the data consumption program is a migration profiler program, future migration issues are reported. These future migration issues are differences between the available functionality and unavailable functionality on a future system. Identification of functions which are changed or removed assists in assessing future system migrations. Additionally, the user can further utilize the information reported by the functional building blocks. By using the dependency information found in the functional building blocks, it would be very easy to determine if a new function is not in use. If it is determined the function is not in use, the dependencies are satisfied on the current system. The exploited information is a report of entities currently on a system which can be used to identify future functions. The knowledge provided by this view could be used to understand which new functionality has been utilized. By checking to see if a functionality is in use, a user may consider using a new or different functionality.

Figure 5:
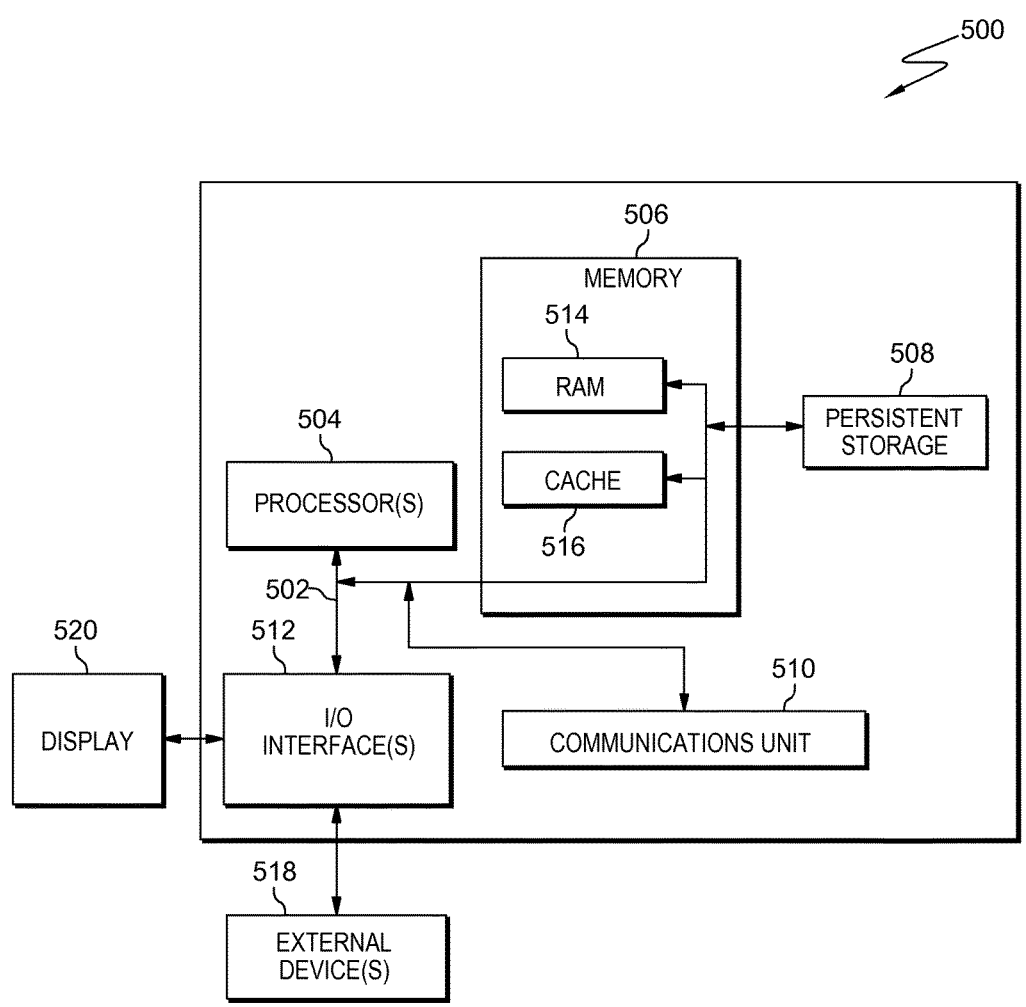
FIG. 5 depicts a block diagram of components of a computing device, in accordance with an illustrative embodiment of the present invention.

FIG. 5 depicts a block diagram of components of a computing device, generally designated 500, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Program instructions and data used to practice embodiments of the present invention may be stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for performing data analysis, the computer program product comprising:
   a computer readable storage medium; and
   computer program code stored on the computer readable storage medium, with the computer program code including instructions and data for causing a processor(s) set to perform operations including the following:
      collecting a software execution data set, with the software execution data set including information indicative of existing management, measurement, and monitoring data from a first computer system,
      connecting to a data consumption program, with the data consumption program being instructed to retrieve the existing management, measurement, and monitoring data from the first computer system, with the data consumption program being a migration profiler program that is programmed to reduce data migration failures during a data migration, transforming the existing management, measurement, and monitoring data into a plurality of building blocks based on an iterative approach, for each given building block of the plurality of building blocks, determining a set of field information value(s), and for each given building block of the plurality of building blocks:
- mapping the set of field information value(s) of the given building block to a higher functionality, and
- inputting the higher functionality of the given building block to the migration profiler program to produce a resultant block of data which includes critical information pertaining to migration capabilities.

2. The computer program product of claim 1, wherein the computer program code further includes instructions and data for causing the processor(s) set to perform the following operation(s):
notifying, by the migration profiler program, a system administrator which functions of products are installed in a system.

3. The computer program product of claim 2, wherein the computer program code further includes instructions and data for causing the processor(s) set to perform the following operation(s):
consolidating, by the migration profiler program, functions that are in use on the system.

4. The computer program product of claim 3, wherein the computer program code further includes instructions and data for causing the processor(s) set to perform the following operation(s):
determining, by the migration profiler program, whether a set of migration(s) is necessary.

5. A computer system for performing data analysis, the computer system comprising:
- a processor(s) set;
- a computer readable storage medium; and
- computer program code stored on the computer readable storage medium, with the computer program code including instructions and data for causing the processor(s) set to perform operations including the following:
  collecting a software execution data set, with the software execution data set including information indicative of existing management, measurement, and monitoring data from a first computer system,
  connecting to a data consumption program, with the data consumption program being instructed to retrieve the existing management, measurement, and monitoring data from a first computer system, with the data consumption program being a migration profiler program that is programmed to reduce data migration failures during a data migration,
  transforming the existing management, measurement, and monitoring data into a plurality building blocks based on an iterative approach,
  for each given building block of the plurality of building blocks, determining a set of field information value(s), and
  for each given building block of the plurality of building blocks:
  - mapping the set of field information value(s) of the given building block to a higher functionality, and
  - inputting the higher functionality of the given building block to the migration profiler program to produce a resultant block of data which includes critical information pertaining to migration capabilities.

6. The computer system of claim 5, wherein the computer program code further includes instructions and data for causing the processor(s) set to perform the following operation(s):
notifying, by the migration profiler program, a system administrator which functions of products are installed in a system.

7. The computer system of claim 6, wherein the computer program code further includes instructions and data for causing the processor(s) set to perform the following operation(s):
consolidating, by the migration profiler program, functions that are in use on the system.

8. The computer system of claim 7, wherein the computer program code further includes instructions and data for causing the processor(s) set to perform the following operation(s):
determining, by the migration profiler program, whether a set of migration(s) is necessary.

* * * * *